US011229320B2

(12) United States Patent
Chen et al.

(10) Patent No.: US 11,229,320 B2
(45) Date of Patent: Jan. 25, 2022

(54) FOOD HEATING DEVICE WITH MULTILAYER SHELF

(71) Applicant: PRESIDENT CHAIN STORE CORP., Taipei (TW)

(72) Inventors: Hung-Wei Chen, Taipei (TW); Hsiu-Chuan Chang, Taipei (TW); Kuo-Yi Liu, Taipei (TW); Li-Ping Yang, Taipei (TW); Chun-Ling Tai, Taipei (TW)

(73) Assignee: PRESIDENT CHAIN STORE CORP., Taipei (TW)

( * ) Notice: Subject to any disclaimer, the term of this patent is extended or adjusted under 35 U.S.C. 154(b) by 393 days.

(21) Appl. No.: 16/175,407

(22) Filed: Oct. 30, 2018

(65) Prior Publication Data

US 2019/0208956 A1    Jul. 11, 2019

(30) Foreign Application Priority Data

Jan. 5, 2018  (TW) .................................. 107200269

(51) Int. Cl.
*A47J 37/04*      (2006.01)
*A47J 36/32*      (2006.01)

(52) U.S. Cl.
CPC .............. *A47J 37/048* (2013.01); *A47J 36/32* (2013.01)

(58) Field of Classification Search
CPC .......... A47J 37/048; A47J 36/32; A47J 27/14; A47J 37/04; A47J 43/18; A47J 37/041; A47J 37/0611; A47J 37/0629; A47J 36/2488; A47J 43/08; A47J 37/0664; A47J 37/0694; A47J 37/042; A47J 37/0641; A47J 36/06; A47J 37/0786; A47J 37/043; A47J 37/0623; A47J 37/0635; A47J 37/015; A47J 37/0704; A47J 37/0754; A47J 37/0709; A47J 39/006; A47J 39/003; A47F 3/001;
(Continued)

(56) References Cited

U.S. PATENT DOCUMENTS

2003/0010218 A1 *   1/2003   Evans .................... A47J 37/048
2005/0061161 A1 *   3/2005   Hunot ................... A47J 37/048
                                                        99/441

(Continued)

OTHER PUBLICATIONS

Office Action issued in corresponding Canadian patent application dated Oct. 4, 2019.

*Primary Examiner* — Robert J Utama
*Assistant Examiner* — Rachel R Rizzo
(74) *Attorney, Agent, or Firm* — Muncy, Geissler, Olds & Lowe, P.C.

(57) ABSTRACT

A food heating device with multilayer shelf includes a base, one or more shelf support, a first side wall member, a second side wall member, a bottom cover member, a middle cover member, and a top lamp bracket. There are two or more layers of heating rollers between the first side wall member and the second side wall member. The bottom cover member and the middle cover member are disposed above bottom heating rollers and middle heating rollers. Each of the cover members at different layers has a cover body. The cover body covers foods on the heating rollers. In addition, one or more lamp bodies can be provided. The food heating device with multilayer shelf is capable of increasing space for exhibition of foods and also increasing overall brightness by adding the lamp bodies.

8 Claims, 4 Drawing Sheets

(58) Field of Classification Search
CPC .......... A47F 7/0071; A47F 3/08; A47F 11/10;
A47F 10/06; A47F 3/0404; A47F 3/0469;
A47F 5/025; H05B 3/06; H05B 3/68;
H05B 3/76; H05B 3/0095; H05B 3/0033;
H05B 1/02; H05B 6/1209; H05B 3/0076;
G07F 17/0071; G07F 11/70; G07F 11/72;
G07F 11/16; G07F 17/0078; G07F 9/105;
G07F 11/58; B23P 19/084; F24C 7/06;
F24C 15/16; F24C 15/08; F24C 15/02;
F24C 7/087; F24C 15/164; F25D 11/022;
F25D 27/00; F25D 23/00; F25D 11/00;
F25D 23/067; F25D 25/02; F21S 8/037;
F21S 4/28; F21S 2/00; E06B 9/40; C09B
43/16; C09B 67/0055; G03G 15/00; B41J
2/471; F21K 9/00; F21V 29/75; F21V
29/763; A23L 5/10; A21B 2/00; A47B
97/00; A47B 81/06
See application file for complete search history.

(56) References Cited

U.S. PATENT DOCUMENTS

2008/0083722 A1\* 4/2008 Quella .................... A47F 3/001
2017/0065124 A1\* 3/2017 Colston ................ A47J 37/067

\* cited by examiner

FOOD HEATING DEVICE WITH MULTILAYER SHELF

CROSS-REFERENCE TO RELATED APPLICATION

This non-provisional application claims priority under 35 U.S.C. § 119(a) to Patent Application No. 107200269 filed in Taiwan, R.O.C. on Jan. 5, 2018, the entire contents of which are hereby incorporated by reference.

BACKGROUND

Technical Field

The instant disclosure relates to a food heating device with multilayer shelf and, more particularly, to a device capable of increasing space for exhibition of foods and increasing overall brightness.

Related Art

Life style is changing along with the advancing of time and the growing of knowledge economy. Pace of life of modern people is getting tighter and busier. Modern people living in a tight and busy life are required to be efficient and punctual; therefore, fast and simple foods such as fast foods and snacks are widely welcomed by modern people. Most people would buy cooked instant foods in convenience stores. For example, convenience stores provide steamed stuffed buns, steamed buns, hot dogs, breads, steamed egg custard, etc. to satisfy the needs of customers.

The hot dogs among the cooked instant foods as the above examples are popular. A hot dog machine is a daily used baking device for heating hot dogs. The operation of the hot dog machine is to heat rollers by electricity and the rollers rolls and heats the foods (e.g., hot dogs) thereon. Nonetheless, an actual temperature of the rollers cannot be detected; therefore, the temperature of the rollers cannot be adjusted in a real time manner. As a result, while the temperature of the rollers is too high, the surfaces of some of the heated foods (e.g., hot dogs) can be burnt, ripped, or scorched to negatively influence the looks and the sales of the foods.

In contrast, while the temperature of the rollers is too low, the heated foods (e.g., hot dogs) may be underdone, or the holding temperature of the heated foods (e.g., hot dogs) cannot be reached, such that the heated foods (e.g., hot dogs) may be putrid. Consequently, the heated foods (e.g., hot dogs) have defects and cannot satisfy the needs of consumers.

In addition, even though the above issue of temperature control can be resolved, there is still another issue. Most shelves for exhibition of foods in the convenience stores are one-layer shelves. The space for exhibiting and arranging foods in the stores is limited. During rush hour, there is not enough time to replenish foods on the shelves, which results in the loss of business.

To address the above issues, the instant disclosure provides a great solution, which not only meets the effect of constant temperature control, but also meets the effects of increasing the space for exhibition of foods and increasing the overall brightness by adding multilayer space for exhibition and corresponding lamps.

SUMMARY

A food heating device with multilayer shelf comprises a first side wall member; a second side wall member; a base, two sides of the base being respectively connected to the first side wall member and the second side wall member, an external surface of the base being provided with a temperature control panel, a plurality of bottom heating rollers being disposed above the base and between the first side wall member and the second side wall member; a bottom cover member at least comprising a bottom cover body and at least one bottom connecting component connected to the bottom cover body, wherein the bottom connecting component is connected to the base, and the bottom cover body is capable of being opened and closed by a certain angle above the bottom heating rollers; at least one shelf support above the base, two sides of the shelf support being respectively connected to the first side wall member and the second side wall member, a plurality of middle heating rollers being disposed above each shelf support and between the first side wall member and the second side wall member, at least one middle lamp body being disposed under the middle heating rollers; a middle cover member at least comprising a middle cover body and at least one middle connecting component connected to the middle cover body, wherein the middle connecting component is connected to the shelf support, and the middle cover body is capable of being opened and closed by a certain angle above the middle heating rollers; and a top lamp bracket comprising at least one lamp body and at least one connecting component disposed on two sides of the lamp body, the connecting component being connected to the first side wall member and the second side wall member to have the lamp body cross and illuminate above the first side wall member and the second side wall member.

In a preferred embodiment, the temperature control panel is electrically connected to the bottom heating rollers and the middle heating rollers to control the temperatures of the bottom heating rollers and the middle heating rollers.

In a preferred embodiment, an openable plate is disposed between the first side wall member and the second side wall member. The openable plate is capable of being opened to expose the temperature control panel of the base or being closed to cover the temperature control panel of the base.

In a preferred embodiment, the top lamp bracket is further connected with a plate.

In a preferred embodiment, an end of the bottom connecting component is connected to the bottom cover body, and another end of the bottom connecting component is connected to a rear side of the base. The bottom connecting component comprises a rotation axle, and the rotation axle is to have the bottom cover body connected to the bottom connecting component be capable of being opened and closed upwardly and downwardly by a certain angle.

In a preferred embodiment, an end of the middle connecting component is connected to the middle cover body, and another end of the middle connecting component is connected to a rear side of the shelf support. The middle connecting component comprises a rotation axle, and the rotation axle is to have the middle cover body connected to the middle connecting component be capable of being opened and closed upwardly and downwardly by a certain angle.

In a preferred embodiment, both of the bottom heating roller and the middle heating roller comprise roller bodies and electric heating tubes. The roller body is a hollow tube, and the electric heating tube is disposed in the roller body.

In a preferred embodiment, the base is connected with a bottom plate, and the bottom plate is correspondingly disposed under the bottom heating rollers.

In a preferred embodiment, the shelf support is connected with a middle plate, and the middle plate is correspondingly disposed under the middle heating rollers.

In a preferred embodiment, the bottom cover body and the middle cover body are made by transparent material.

DETAILED DESCRIPTION

Figure 1:
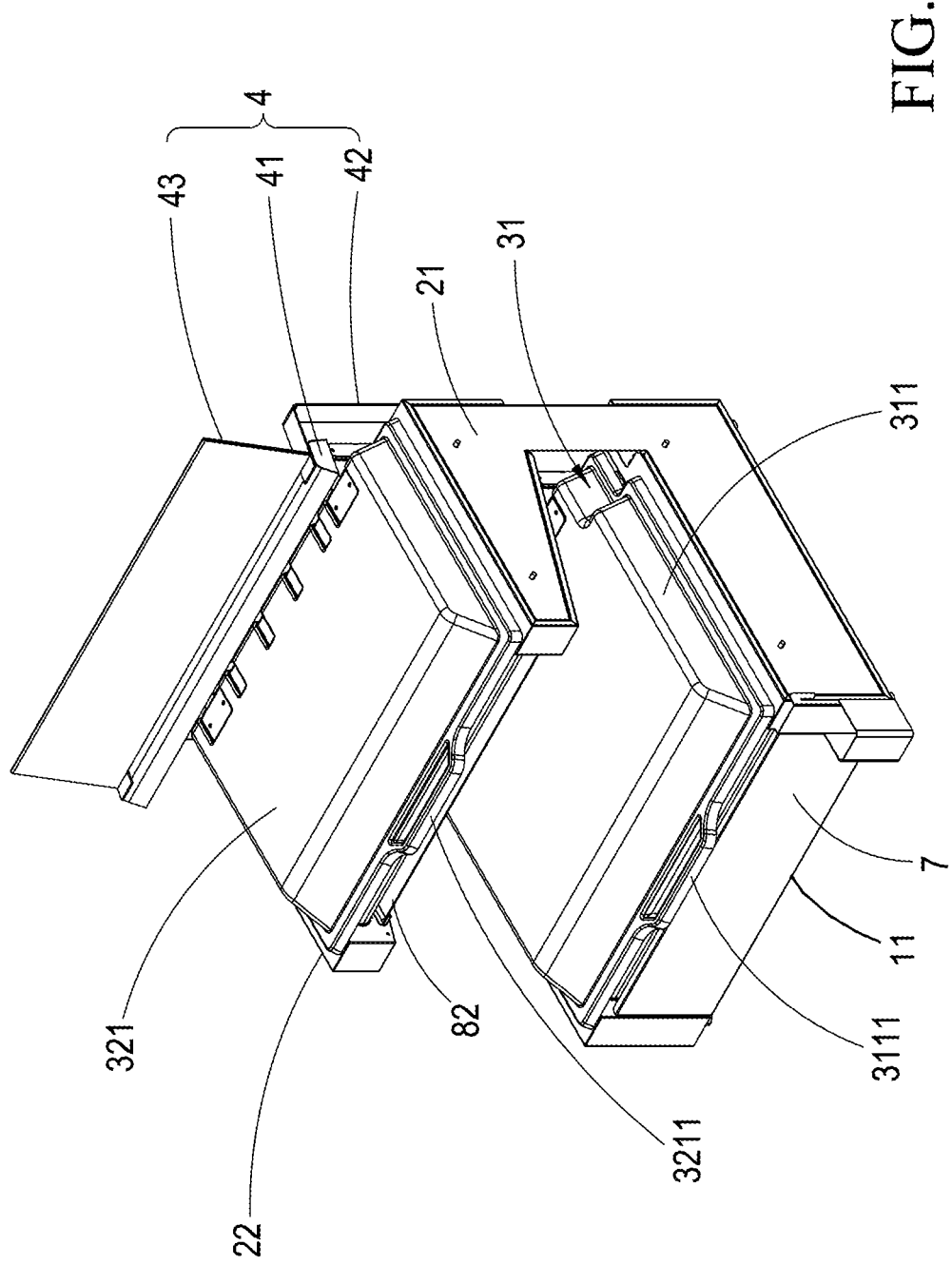
FIG. 1 illustrates a three dimensional perspective front of a food heating device with multilayer shelf according to an embodiment of the instant disclosure.
Figure 2:
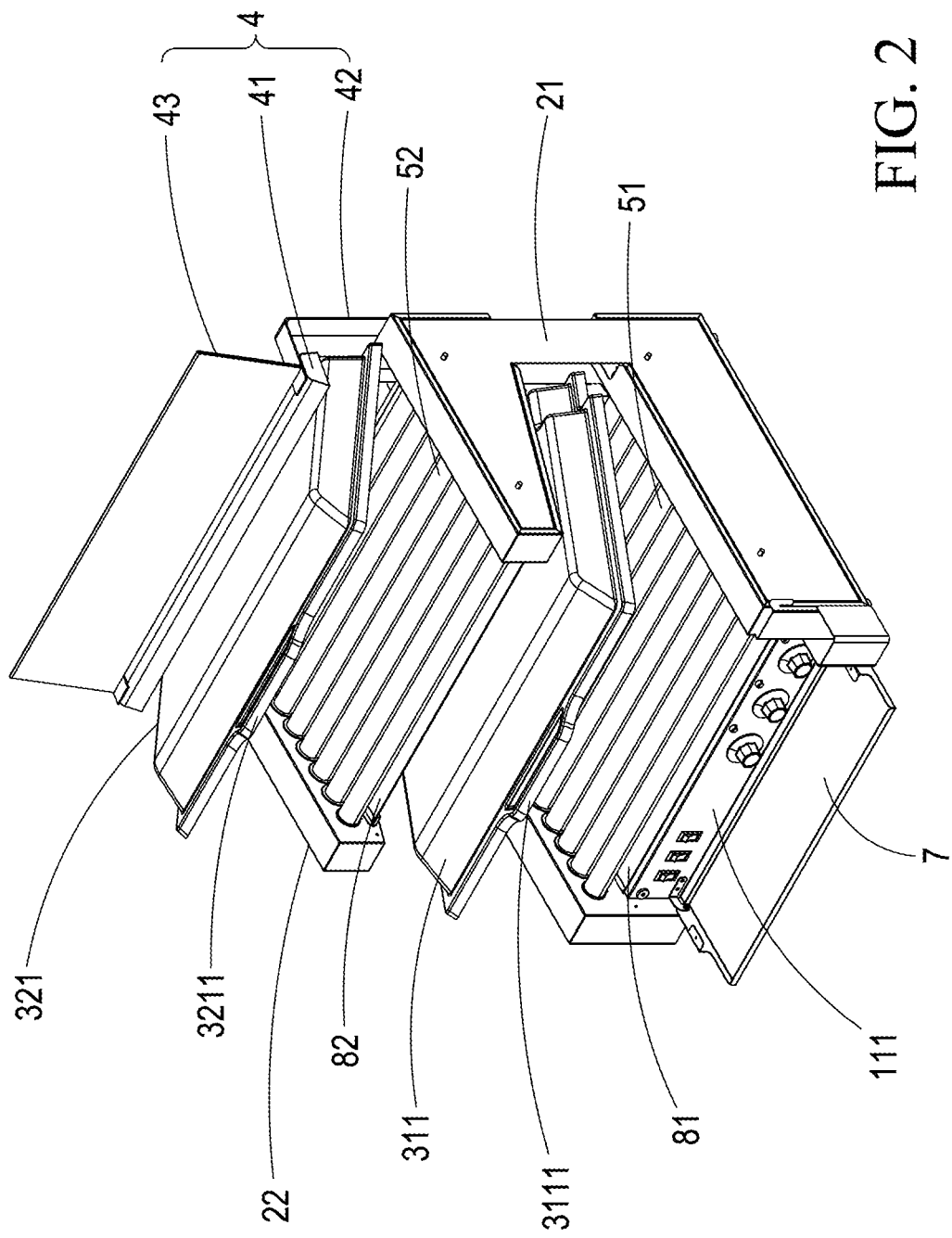
FIG. 2 illustrates a three dimensional perspective view with opened covers of a food heating device with multilayer shelf according to an embodiment of the instant disclosure.
Figure 3:
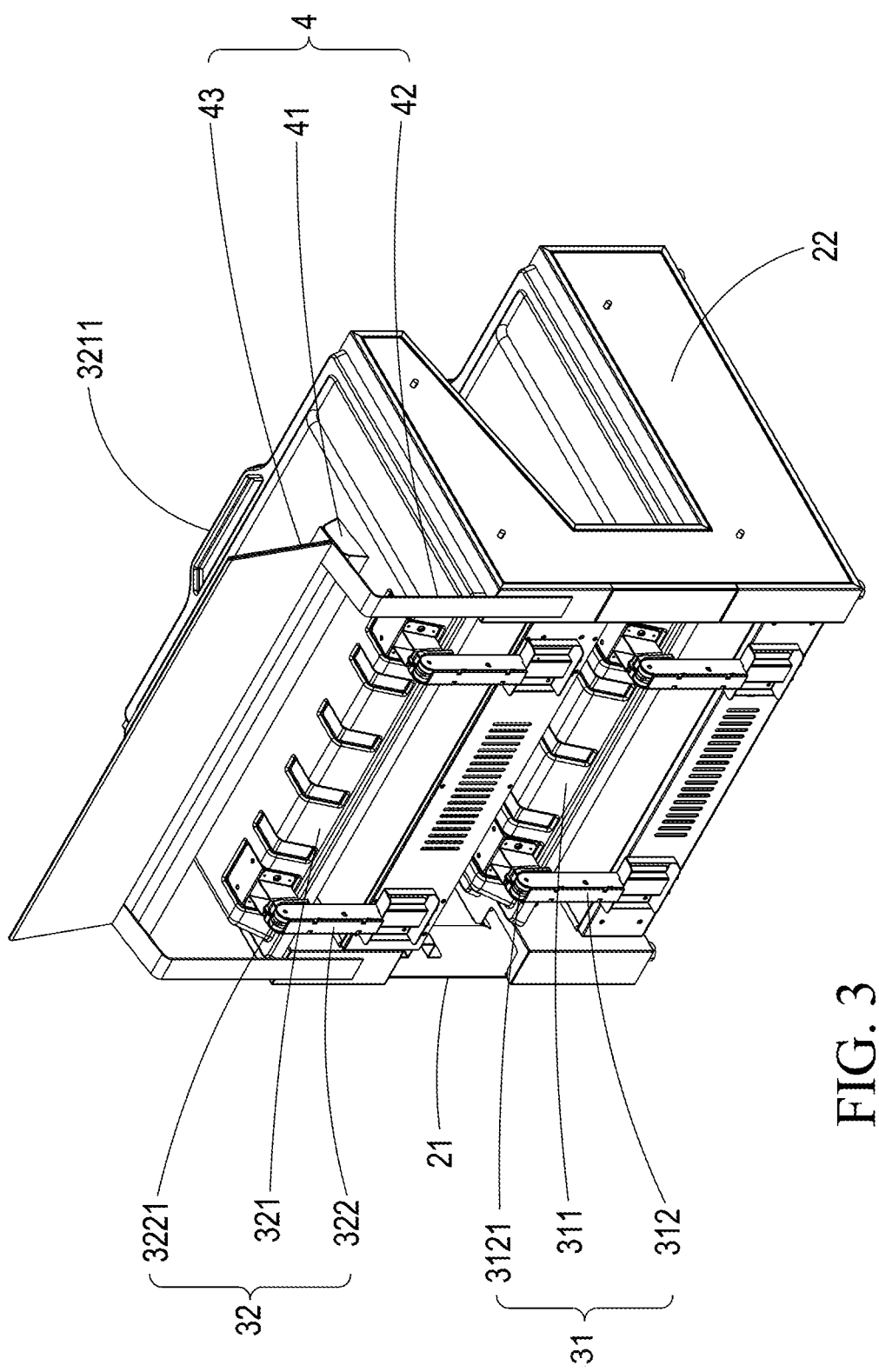
FIG. 3 illustrates a three dimensional perspective rear view of a food heating device with multilayer shelf according to an embodiment of the instant disclosure.

The contents, features, and effects of the instant disclosure will become understandable to those of ordinary skill in the art after reading the following detailed description of the preferred embodiment that is illustrated in the various figures and drawings.

Please refer to FIG. 1 to FIG. 4, which are a three dimensional perspective front view, a three dimensional perspective view with opened covers, a three dimensional perspective rear view rear, and a cross sectional view of a food heating device with multilayer shelf according to an embodiment of the instant disclosure. According to the drawings, the food heating device with multilayer shelf comprises a base 11, at least one shelf support 12, a first side wall member 21, a second side wall member 22, a bottom cover member 31, a middle cover member 32, and a top lamp bracket 4.

In the embodiment, two sides of the base 11 are respectively connected to the first side wall member 21 and the second side wall member 22. There are a plurality of bottom heating rollers 51 being disposed above the base 11 and between the first side wall member 21 and the second side wall member 22. In addition, an external surface of the base 11 is provided with a temperature control panel 111. The temperature control panel 111 is electrically connected to the bottom heating rollers 51 and middle heating rollers 52 to control the temperatures of the bottom heating rollers 51 and the middle heating rollers 52.

The base 11 is connected with a bottom plate 81. The bottom plate 81 is correspondingly disposed under the bottom heating rollers 51. In addition, there is an openable plate 7 being disposed between the first side wall member 21 and the second side wall member 22. The openable plate 7 is capable of being opened to expose the temperature control panel 111 of the base 11 or being closed to cover the temperature control panel 111 of the base 11.

In the embodiment, the bottom cover member 31 at least comprises a bottom cover body 311 made by transparent material and at least one bottom connecting component 312 connected to the bottom cover body 311. In the embodiment, the bottom connecting component 312 is connected to the base 11, and the bottom cover body 311 is capable of being opened and closed by a certain angle above the bottom heating rollers 51.

An end of the bottom connecting component 312 is connected to the bottom cover body 311, and another end of the bottom connecting component 312 is connected to a rear side of the base 11. The bottom connecting component 312 comprises a rotation axle 3121. The rotation axle 3121 is to have the bottom cover body 311 connected to the bottom connecting component 312 be capable of being opened and closed upwardly and downwardly by a certain angle.

In the embodiment, the shelf support 12 is above the base 11. Two sides of the shelf support 12 are respectively connected to the first side wall member 21 and the second side wall member 22. There are a plurality of middle heating rollers 52 being disposed above each shelf support 12 and between the first side wall member 21 and the second side wall member 22.

The shelf support 12 is connected with a middle plate 82. The middle plate 82 is correspondingly disposed under the middle heating rollers 52. In addition, there is at least one middle lamp body 6 being disposed under the middle heating rollers 52.

In the embodiment, the middle cover member 32 at least comprises a middle cover body 321 made by transparent material and at least one middle connecting component 322 connected to the middle cover body 321. In the embodiment, the middle connecting component 322 is connected to the shelf support 12. The middle cover body 321 is capable of being opened and closed by a certain angle above the middle heating rollers 52.

An end of the middle connecting component 322 is connected to the middle cover body 321, and another end of the middle connecting component 322 is connected to a rear side of the shelf support 12. The middle connecting component 322 comprises a rotation axle 3221. The rotation axle 3221 is to have the middle cover body 321 connected to the middle connecting component 322 be capable of being opened and closed upwardly and downwardly by a certain angle.

In the embodiment, the top lamp bracket 4 comprises at least one lamp body 41 and at least one connecting component 42 disposed on two sides of the lamp body 41. The connecting component 42 is connected to the first side wall member 21 and the second side wall member 22 to have the lamp body 41 cross and illuminate above the first side wall member 21 and the second side wall member 22. In addition, the top lamp bracket 4 is further connected with a plate 43. The plate 43 is for placing advertisement material.

Figure 4:
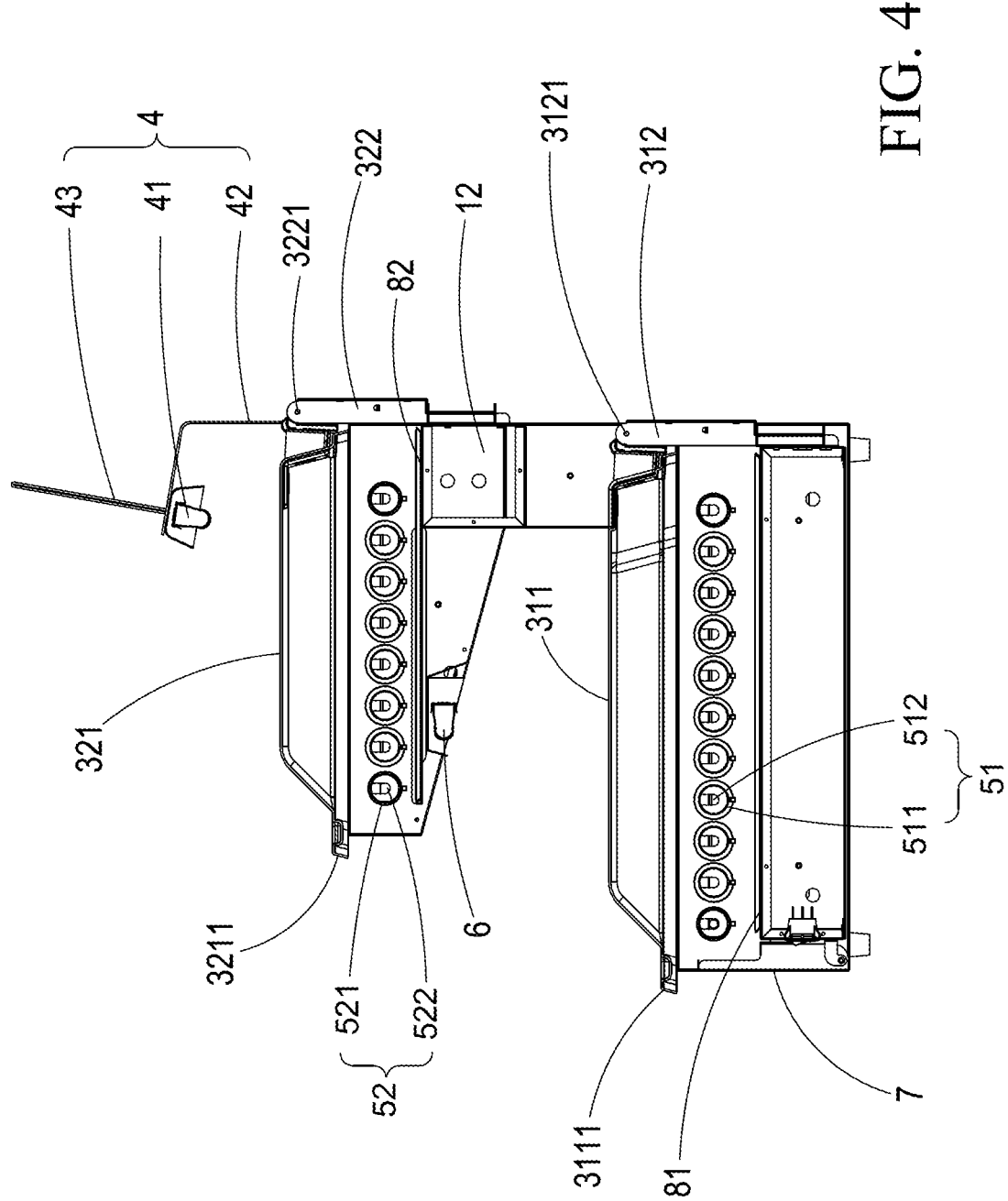
FIG. 4 illustrates a cross sectional view of a food heating device with multilayer shelf according to an embodiment of the instant disclosure.

As shown in FIG. 4, both of the bottom heating roller 51 and the middle heating roller 52 comprise roller bodies 511, 521 and electric heating tubes 512, 522. The roller bodies 511, 521 are hollow tubes, and the electric heating tubes 512, 522 are disposed in the roller bodies 511, 521.

In a case of food placement, products defrosted in microwave can be placed on the middle heating rollers 52, and general frozen hot dogs can be placed on the bottom heating rollers 51. According to the embodiments of the instant disclosure, the space for exhibition of foods can be increased by the multilayer shelf. Thus more products can be sold, and more choices of products can be provided to target group, e.g., young group.

Comparing to prior arts, the food heating device with multilayer shelf provided by the instant disclosure has many advantages as follows:

1. According to the instant disclosure, the effect of the constant temperature control can be met, and multilayer exhibition space can be provided. As a result, the issue of the loss of business due to not enough time for replenishing foods on shelves during rush hour in high sales stores can be resolved.

2. According to the instant disclosure, the space for exhibition of foods can be increased, and the overall brightness can also be increased by adding the corresponding lamp bodies.

While the instant disclosure has been described by way of example and in terms of the preferred embodiments, it is to be understood that the instant disclosure needs not be limited to the disclosed embodiments. For anyone skilled in the art, various modifications and improvements within the spirit of the instant disclosure are covered under the scope of the instant disclosure. The covered scope of the instant disclosure is based on the appended claims.

What is claimed is:

1. A food heating device with multilayer shelf, comprising:
   a first side wall member;
   a second side wall member;
   a base, two sides of the base being respectively connected to the first side wall member and the second side wall member, and external surface of the base being provided with a temperature control panel, a plurality of bottom heating rollers being disposed above the base and between the first side wall member and the second side wall member;
   a bottom cover member at least comprising a bottom cover body and at least one bottom connecting component connected to the bottom cover body, wherein the bottom connecting component comprises a rotation axle, the bottom connecting component is connected to the base, and the bottom cover body is capable of being opened and closed above the bottom heating rollers, and the rotation axel is to have the bottom cover body connected to the bottom connecting component be capable of being opened and closed upwardly and downwardly;
   at least one shelf support above the base, two sides of the shelf support being respectively connected to the first side wall member and the second side wall member, a plurality of middle heating rollers being disposed above each shelf support and between the first side wall member and the second side wall member, at least one middle lamp body being disposed under the middle heating rollers, the shelf support is connected with a middle plate, and the middle plate is correspondingly disposed under the middle heating rollers;
   a middle cover member at least comprising a middle cover body and at least one middle connecting component connected to the middle cover body, wherein the middle connecting component is connected to the shelf support, and the middle cover body is capable of being opened and closed above the middle heating rollers; and
   a top lamp bracket comprising at least one lamp body and at least one connecting component disposed on two sides of the lamp body, the connecting component being connected to the first side wall member and the second side wall member to have the lamp body cross and illuminate above the first side wall member and the second side wall member.

2. The food heating device with multilayer shelf of claim 1, wherein the temperature control panel is electrically connected to the bottom heating rollers and the middle heating rollers to control the temperatures of the bottom heating rollers and the middle heating rollers.

3. The food heating device with multilayer shelf of claim 1, wherein an openable plate is disposed between the first side wall member and the second side wall member, and the openable plate is capable of being opened to expose the temperature control panel of the base or being closed to cover the temperature control panel of the base.

4. The food heating device with multilayer shelf of claim 1, wherein the top lamp bracket is further connected with a top plate.

5. The food heating device with multilayer shelf of claim 1, wherein an end of the middle connecting component is connected to the middle cover body, another end of the middle connecting component is connected to a rear side of the shelf support, the middle connecting component comprises a rotation axel, and the rotation axle is to have the middle cover body connected to the middle connecting component be capable of being opened and closed upwardly and downwardly.

6. The food heating device with multilayer shelf of claim 1, wherein both of the bottom heating roller and the middle heating roller comprise roller bodies and electric heating tubes, the roller body is a hollow tube, and the electric heating tube is disposed in the roller body.

7. The food heating device with multilayer shelf of claim 1, wherein the base is connected with a bottom plate, and the bottom plate is correspondingly disposed under the bottom heating rollers.

8. The food heating device with multilayer shelf of claim 1, wherein the bottom cover body and the middle cover body are made by transparent material.

* * * * *